(12) United States Patent  
Ryan et al.

(10) Patent No.: US 7,065,601 B2
(45) Date of Patent: Jun. 20, 2006

(54) INTERFACE FOR PROTOTYPING INTEGRATED SYSTEMS

(75) Inventors: Stuart Ryan, Hotwells (GB); Andrew Jones, Redland (GB)

(73) Assignee: STMicroelectronics N.V. (NL)

( * ) Notice: Subject to any disclaimer, the term of this patent is extended or adjusted under 35 U.S.C. 154(b) by 8 days.

(21) Appl. No.: 10/456,860

(22) Filed: Jun. 6, 2003

(65) Prior Publication Data

US 2005/0005226 A1    Jan. 6, 2005

(51) Int. Cl.
*G06F 13/14* (2006.01)

(52) U.S. Cl. ...................... 710/305; 710/315
(58) Field of Classification Search ........... 710/305, 710/100, 315; 714/741–742, 30; 716/16
See application file for complete search history.

(56) References Cited

U.S. PATENT DOCUMENTS

| | | | | |
|---|---|---|---|---|
| 5,948,077 A | * | 9/1999 | Choi et al. ................. 710/9 |
| 5,954,824 A | * | 9/1999 | Cherichetti et al. ......... 714/28 |
| 6,199,137 B1 | * | 3/2001 | Aguilar et al. ............. 710/305 |
| 6,467,010 B1 | * | 10/2002 | Pontius et al. ............. 710/305 |
| 2002/0032831 A1 | * | 3/2002 | Saulsbury et al. .......... 711/105 |
| 2004/0019827 A1 | * | 1/2004 | Rohfleisch et al. .......... 714/29 |
| 2004/0250164 A1 | * | 12/2004 | Ahmad et al. ............... 714/30 |

OTHER PUBLICATIONS

XILINX, The Programmable Logic Data Book, 1994, p. 2-36-2-37.*

* cited by examiner

*Primary Examiner*—Tim Vo
(74) *Attorney, Agent, or Firm*—Lisa K. Jorgenson; William A. Munck

(57) ABSTRACT

An interface is described which has at least one chip side port with a first plurality of pins for conveying fields of a packet and first and second circuit side ports each port having a set of pins with a lower number than the first set of pins in the chip side port. The interface is constructed so that interrupt signals from an off-chip circuit can be conveyed on-chip in a manner such that the interrupt signals are indistinguishable from interrupt signals received from on-chip modules connected to an on-chip communication path. The same principle is applicable to power-down signals.

14 Claims, 5 Drawing Sheets

Cycle

| 12 | 11 | 10 | 9 | 8 | 7 | 6 | 5 | 4 | 3 | 2 | 1 | |
|---|---|---|---|---|---|---|---|---|---|---|---|---|
| data | data | data | data | data | data | data | data | addr | addr | src | opc | Data |
| data | data | data | data | data | data | data | data | addr | addr | tid | lck | |
| 1 | 1 | 1 | 1 | 0 | 0 | 0 | 0 | X | X | X | X | Be1 |
| 1 | 1 | 1 | 1 | 0 | 0 | 0 | 0 | X | X | X | X | Be2 |
| 1 | 1 | 1 | 1 | 1 | 1 | 1 | 1 | 1 | 1 | 1 | 1 | Valid |
| 1 | 0 | 0 | 0 | 0 | 0 | 0 | 0 | 0 | 0 | 0 | 0 | eop |

| 10 | 9 | 8 | 7 | 6 | 5 | 4 | 3 | 2 | 1 | |
|---|---|---|---|---|---|---|---|---|---|---|
| data | data | data | data | data | data | data | data | r_src | opc | Data |
| data | data | data | data | data | data | data | data | r_tid | lck | |
| 1 | 1 | 1 | 1 | 0 | 0 | 0 | 0 | X | X | Be1 |
| 1 | 1 | 1 | 1 | 0 | 0 | 0 | 0 | X | X | Be2 |
| 1 | 1 | 1 | 1 | 1 | 1 | 1 | 1 | 1 | 1 | Valid |
| 1 | 0 | 0 | 0 | 0 | 0 | 0 | 0 | 0 | 0 | eop |

INTERFACE FOR PROTOTYPING INTEGRATED SYSTEMS

FIELD OF THE INVENTION

The present invention relates to an interface, and particularly an interface suitable for facilitating prototyping of to-be integrated systems with off-chip and on-chip resources.

BACKGROUND TO THE INVENTION

To prototype a system it is convenient to have a processor on-chip running at its normal speed, and the logic which is ultimately to be integrated onto the chip as off-chip logic for prototyping purposes, said off-chip logic being for example in the form of an FPGA or an emulator.

Currently, this involves either bonding out the processor core so that its signals are available off-chip, or using one of the existing off-chip communication ports which are already provided on the chip on which the processor is situated. Such ports are generally serial ports or reduced pin out ports such as debug ports, and in any event are not provided as dedicated ports for prototyping but have some already existing function.

In a situation where the processor core is bonded out, there are a number of problems. In the first place, bonding out of a processor's on-chip interfaces uses a lot of pins. The processor has to be run at reduced speed in order for the bond out interface to function reliably. The limitation on the use of pins means that it is difficult to support platform prototyping where some resources are integrated on-chip and some are not.

Where an existing off-chip communication port is used, there are also difficulties. Many such ports require software assistance to function. This software is not required in the integrated system which is under prototype, which means that the prototype software and the final software will have to be different. In effect, the final software cannot run on the prototype and therefore any testing of the prototype cannot completely match the final product.

Where interrupts or power down requests need to be made, these have to be supplied via the off-chip communication port. This means that software assistance is required at the port to allow the prototype to share existing system resources in order to raise interrupts to a core or receive notification of a request to enter a low power mode.

SUMMARY OF THE INVENTION

According to one aspect of the invention there is provided an interface for carrying packets each comprising a plurality of fields including a data field between an on-chip communication path connected to at least one on-chip module and off-chip circuitry, said interface comprising; at least one chip-side port comprising a plurality of pins for conveying the fields of the packet in parallel; first and second circuit-side ports, each port comprising a set of pins having a lower number than the pins of said at least one chip-side port, each of said first and second circuit-side ports providing a unidirectional pathway for data between said interface and said off-chip circuitry; and means for transmitting interrupt signals from said off-chip circuit to said on-chip communication path in a manner such that said interrupt signals are indistinguishable from interrupt signals received from on-chip modules connected to said on-chip communication path.

Preferably the interface includes means for conveying power down signals between said off-chip circuit and said on-chip communication path in a manner indistinguishable from power down signals provided between on-chip modules connected to said on-chip communication path. The means for transmitting the interrupt signals and the power down signals can comprise respective sets of interrupt connections and power down connections. In particular, the set of connections for providing interrupt signals can comprise a first group of dedicated pins on the circuit-side of the interface, a second group of dedicated pins on the chip-side of the interface and respective dedicated wires interconnecting said pins. Similarly, the set of connections for conveying said power down signals can comprise a third set of power down pins on the circuit-side of the interface, a fourth set of power down pins on the chip-side of the interface and respective dedicated wires connecting said third and fourth sets of power down pins.

The interface can further include circuitry for adapting the speed of a system clock generated elsewhere in the system for generating an interface clock at a frequency different from the system clock controlling a chip on which the interface is implemented.

The interface can further include chopping circuitry for chopping a packet transmitted from the communication pathway on the plurality of pins of said at least one chip-side port so as to be transmitted in a plurality of cycles on the lower number of pins of said first circuit-side port.

The interface can further include circuitry for reassembling data received in a plurality of cycles on said set of pins at said second circuit-side port into a single packet for transmission in parallel onto the communication path from said at least one chip-side port.

Preferably the fields of the packet include data fields.

Said at least one chip-side port is preferably bidirectional.

According to another aspect there is provided an integrated circuit comprising: an on-chip communication path to which is connected a plurality of on-chip functional modules at least one of which is capable of issuing packets; and an interface implemented on-chip and having at least one chip-side port connected to said communication pathway for transmitting said packets in parallel across a plurality of pins, the interface further having first and second circuit-side ports each with a reduced number of pins for communicating said packets off-chip via said reduced number of pins, and including a set of interrupt connections for providing interrupt signals from an off-chip circuit connected to said interface in a manner indistinguishable from interrupt signals provided onto said communication path from said on-chip functional modules.

According to another aspect there is provided a prototype system comprising a chip having a processor module and at least one on-chip module connected to a packet communication path for conveying packets of a first width, said chip having first and second off-chip ports adapted to convey said packets between the chip and a logic circuit connected to said ports in chunks of a second width smaller than the first width, said chip having a set of interrupt connections for transmitting interrupt signals from said off-chip circuit to said processor module in a manner such that said interrupt signals are indistinguishable from interrupt signals provided from said at least one on-chip modules connected to said on-chip communication pathway.

According to another aspect there is provided a method of testing a prototype system comprising an integrated circuit including an on-chip processor connected to a communication path and an off-chip circuit, the method comprising:

executing a computer program on the on-chip processor, said program causing the generation of packets for transmission via said communication path; supplying said packets to an interface in a parallel format, the interface being arranged to convert said parallel format into a reduced width for transmission off-chip via a reduced number of pins to said off-chip circuit; receiving reduced width packets at said interface and converting same to said parallel format for communication to said processor via said communication path; and providing interrupts from said off-chip circuit to said on-chip processor in a manner indistinguishable from interrupts provided by other on-chip modules connected to said on-chip communication pathway.

According to another aspect of the invention there is provided an interface for carrying packets each comprising a plurality of fields including a data field between an on-chip communication path connected to at least one on-chip module and off-chip circuitry, said interface comprising: at least one chip cycle comprising a plurality of pins for conveying the fields of the packet in parallel; first and second circuit-side ports each port comprising a set of pins having a lower number than the pins of said at least one chip-side port, each of said first and second circuit-side ports providing a unidirectional pathway for data between said interface and said off-chip circuitry; and a set of interrupt connections for transmitting interrupt signals from said off-chip circuit to said on-chip communication path in a manner such that said interrupt signals are indistinguishable from interrupt signals received from on-chip modules connected to said on-chip communication path.

Such an arrangement has the advantage that the advantages of existing off-chip communication ports can be fully utilised, without the disadvantage of requiring variation between the prototype software and the final software for supporting interrupts.

Advantages of existing off-chip communication ports include the transmission of memory request and response packets independently of the content or semantics of the packets. Split transaction protocols can be used, leading to loose timing requirements. The port can exist in a dedicated clock domain, meaning that it can be slowed down to suit external logic without affecting the core clock rate or the on-chip communication path.

In addition to these advantages, the fact that there are dedicated pins for providing interrupt signals means that IP on the external circuit can be added transparently. In the preferred embodiment, a similar arrangement allows dedicated pins for prototyping power down requests.

For a better understanding of the present invention and to show how the same may be carried into effect, reference will now be made by way of example to the accompanying drawings.

DESCRIPTION OF THE PREFERRED EMBODIMENT

Figure 1:
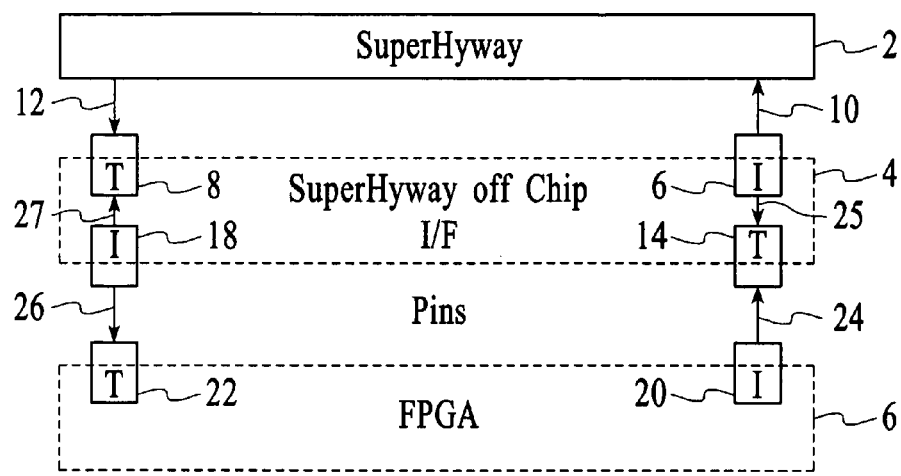
FIG. 1 is a schematic block diagram of a system architecture.

FIG. 1 is a schematic overview of a system architecture implementing an off-chip interface according to one embodiment of the invention. Reference numeral 2 denotes an on-chip bus architecture which is referred to herein as a SuperHyway. Although the invention is described with reference to this particular architecture, it will be appreciated that it can apply to any bus standard. The boundary of the integrated circuit on which the architecture is implemented is not shown in FIG. 1. The architecture includes a bus to which are coupled a number of functional modules, including one or more processor modules. The SuperHyway 2 is connected to a SuperHyway off-chip (SHOC) interface system 4 via incoming and outgoing ports 6, 8 which communicate with the SuperHyway 2 via respective communication channels 10, 12. The SuperHyway off-chip interface system 4 connects the SuperHyway 2 to a logic circuit 6 which in the described embodiment is a field programmable gate array (FPGA) circuit. The SuperHyway off-chip interface system 4 is connected to the logic circuit 6 via respective incoming and outgoing ports 14, 18. These ports communicate with corresponding ports on the logic circuit 20, 22 via respective communication channels 24, 26.

Each of the communication channels 10, 12 satisfy the standards of the bus architecture in the SuperHyway 2. These are high pin out (or wide) channels and therefore are not easy to take off-chip. Similarly the communication channels 24, 26 which provide communication between the interface system 4 and the logic circuit are wide channels. The interface system 4 itself provides communication via narrower channels in the form of two byte wide unidirectional data paths 25, 27 plus control signals (not shown fully in FIG. 1 which is diagrammatic only). The SuperHyway off-chip interface 4 converts the SuperHyway bus communications which are in the form of wide packets into smaller cells for communication over the unidirectional data paths 25, 27.

Figure 2:
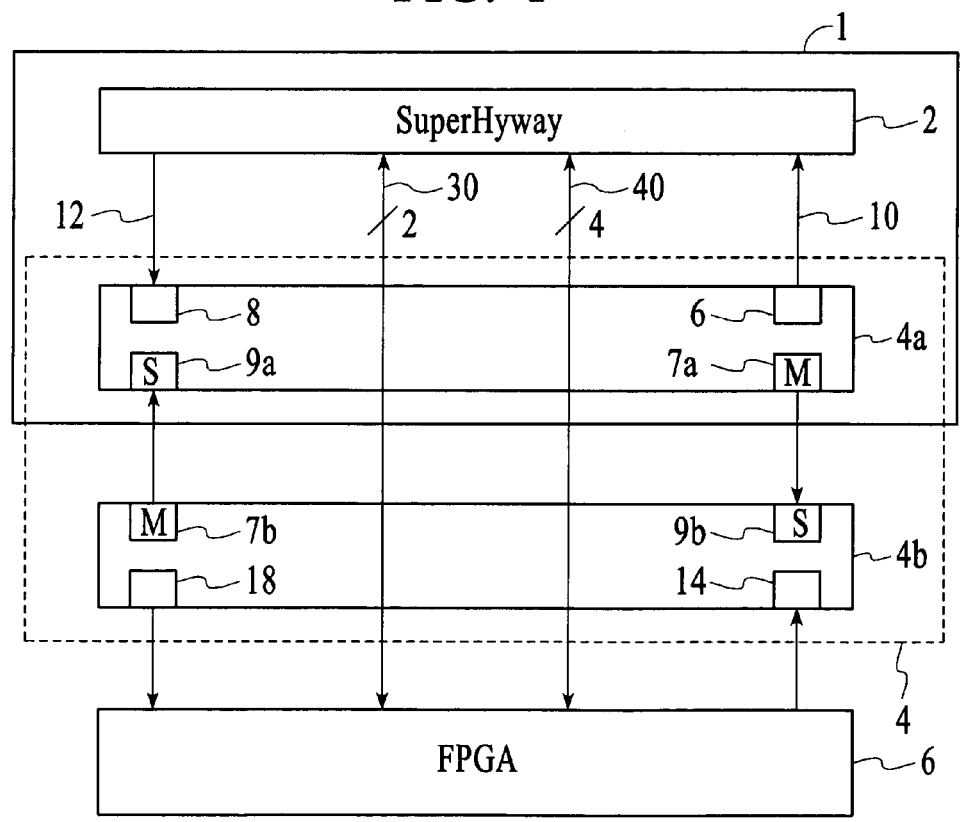
FIG. 2 is a more detailed diagram showing the chip boundary.

FIG. 2 illustrates a structural diagram which indicates how the SHOC interface system 4 shown in FIG. 1 is implemented in practice. The SuperHyway off-chip interface block 4 is actually implemented as two interfaces 4a and 4b which are identical, connected back to back. The interface 4a is implemented on a chip 1 with the SuperHyway 2. The ports 6 and 8 are shown wire-bonded to the SuperHyway 2 via the communication channels 10 and 12 each comprising a large number of pins as shown in more detail later. The ports 14 and 18 of the other interface 4b are shown similarly attached to the logic circuit 6.

In addition to the so-called wide ports 6, 8 on interface 4a, and 14, 18 on interface 4b, each interface has a master port M and a slave port S. The master port M is denoted 7a on interface 4a and 7b on the interface 4b. The slave port S is denoted 9a on the interface 4a and 9b on the interface 4b. As can readily be seen from FIG. 2, the master port 7a of the first interface 4a is connected to the slave port 9b of the second interface 4b, and vice versa. In addition to the ports, there is a set of power down pins denoted generally as 30 and a set of interrupt pins denoted generally by the reference numeral 40. The power down pins 30 and the interrupt pins 40 extend directly through the interface such that the signals on these pins are carried transparently through the interface. The nature of these pins and the manner in which this transparent communication is accomplished is discussed in more detail later. In this way, the interrupt and power down signals provided to the bus from the logic circuit 6 are indistinguishable from similar signals provided from on-chip functional modules connected to the bus.

Figures 3, 4A:
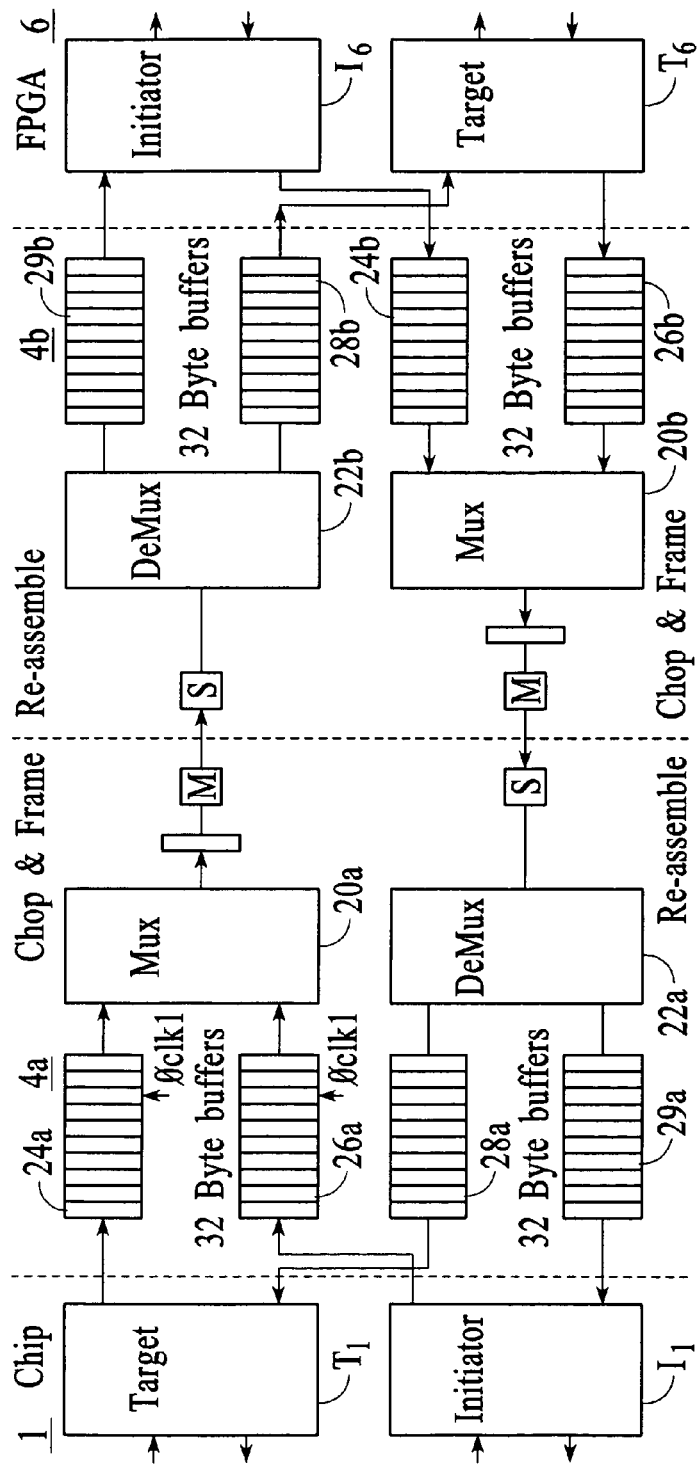
FIG. 3 is a detailed micro-architecture diagram of two interfaces connected back to back.
FIG. 4A shows a request packet in parallel format.

FIG. 3 is a schematic block diagram of the microarchitecture which is shown schematically in FIG. 2. FIG. 3 illustrates target and initiator ports on the first interface referenced $T_1$ and $I_1$ respectively. Target and initiator ports $T_6$, $I_6$ on the second interface are also shown. An initiator module in communication with an initiator port is considered to be a module which, at any particular moment is able to generate a request (for example memory access requests), accept a response and act on the data received. A target module in communication with a target port is a module which is able to accept a request and act upon the command (for example perform a write in the event of a write memory request) and return the result to the initiator module that made the request. The implementation of FIG. 3 provides two unidirectional data streams, one going from left to right in the figure and the other going from right to left. The direction from the chip 1 to the logic circuit 6 (left to right) carries on-chip initiator requests or on-chip target responses. The path going from the logic circuit 6 to the chip 1 (right to left) carries off-chip initiator requests or off-chip target responses. Each interface includes a multiplexer 20a, 20b for multiplexing the data streams. Each interface 4a, 4b also includes a demultiplexer 22a, 22b for demultiplexing the streams accordingly. Each interface 4a, 4b also has first and second transmission buffers 24a, 26a associated respectively with the transmitted streams from the target port $T_1$ and the initiator port $I_1$. Similar transmission buffers 24b, 26b exist in the other interface 4b where the transmission side is now from the logic circuit 6. Receive buffers are also provided on the receive side of each data path, denoted 28a, 29a, 28b, 29b for the initiator requests or target responses respectively. Each interface can perform a chop and frame function on its transmit side and a reassemble function on its receive side. The chop and frame function receives a wide packet and "chops" it up into two byte sized chunks or cells. This is achieved as follows. In the described embodiment, each packet has a maximum width of 32 bytes, so that buffers are all sized accordingly. It will be appreciated that in principle any port and packet size can be implemented. The 32 byte buffer 26a on the transmit side of the interface 4a receives a wide packet (for example a memory access request) from the initiator port $I_1$. The following description will be given in relation to this packet, although it will be appreciated that the buffer 24a performs the same function in relation to response packets received from the target port $T_1$. The request packet is held in the buffer 24a, organised in two byte chunks. Once the interface 4b on the receiving side of that data path has indicated that data can be sent, then the packet is sent out of the buffer 24a via the multiplexer 20a in two byte chunks per clock cycle of a clock signal clk1 applied to the buffers.

The port will transmit any packets, whatever the semantics. By way of example, FIG. 4A shows the format of a request packet ready for transfer across a wide port from the SuperHyway 2. The packet comprises a lock field lck, opcode field opc, source field src, transaction identifier field tid, address field addr, data field data, byte enable field be, end of packet field eop and a valid bit valid. The maximum length of a packet is 32 bytes. The opcode field, opc, source field, src and transaction identifier field tid are each one byte long. The byte enable field be contains a number of bits corresponding to the amount of data in the date field. There is one bit for each byte of data. For example, the data field can be 16 bytes long. The address field can be four bytes long.

Figures 4B, 5, 6:
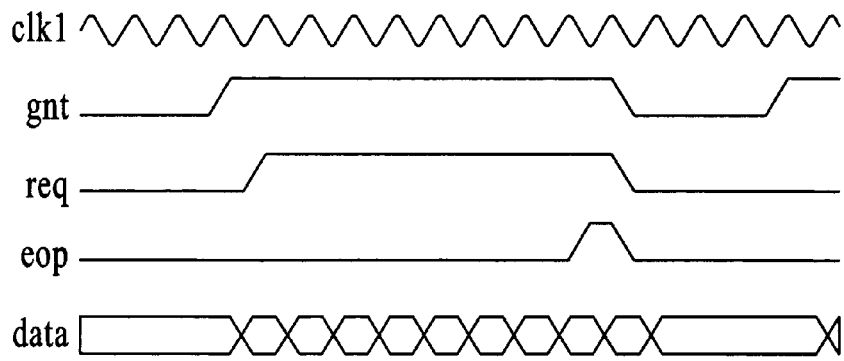
FIG. 4B shows a request packet chopped into chunks.
FIG. 5 shows a response packet chopped into chunks.
FIG. 6 is a timing diagram illustrating a handshake protocol.

FIG. 4B shows such a request packet chopped into two-byte chunks. As mentioned above, these chunks are dispatched under the control of the clock signal clki, as follows. In the first cycle, the one byte opcode opc and one bit lock signal lck are sent. The second cycle contains the src [7:0] and tid [7:0] bytes. For the request packet of FIG. 4B, the next two cycles are address cycles for the address bytes addr and then data is sent over the subsequent cycles. The byte enable field be is chopped along with the rest of the packet. For eight bytes of data, the eight bit byte enable field associated with that data is transmitted in four signals over a two bit byte enable path with forms part of the master and slave ports in parallel with the two byte wide path. A valid bit is sent on each cycle, and the end of packet bit is sent only on the last cycle, the valid and eop bits being transmitted via dedicated wires on the master and slave ports in parallel with the two byte paths. Note however that the end of packet bit which is transmitted as shown in FIG. 4B is regenerated by the port and is not the same as the end of packet bit on the wide packet format shown in FIG. 4A. That is, the port accepts the packet from the SuperHyway and closes that part of the transaction. It then requests to send a packet to the receiving interface which then reassembles the packet and forwards it.

FIG. 5 illustrates a response packet chopped up into chunks. The only difference between transmission of a request packet and transmission of a response packet is that in a response packet there is no need to transmit an address, which removes two cycles of overhead.

In the described embodiment, the maximum packet size on the SuperHyway bus is 32 bytes. Each buffer therefore is a 4 deep by 8 byte wide FIFO, i.e. sufficient to hold one packet. A packet can only be transmitted from a buffer on the transmission side when the transmitting side has a packet to send and the buffer on the receiving side of the corresponding path is empty. A receiving buffer is emptied by sending the reconstructed cells using a SuperHyway bus protocol. Once the buffer is empty (i.e. a cell) with the end of packet signal equal to "one" has been reconstructed and sent successfully) the receiver indicates to the transmitter that it can accept the next packet using a handshake signal. Therefore, data flow between the integrated circuit 1 and the logic circuit 6 is managed at the packet level using a handshake protocol.

In the present description, a chunk is a packet divided by the physical width of the SHOC port, e.g. 2 bytes, while a cell is a packet divided by the physical bus width, e.g. 8 bytes. One chuck is sent per clock cycle when the interface is transmitting.

An example timing diagram for the handshake is shown in FIG. 6. FIG. 6 illustrates the interface clock signal clk1, a grant signal gnt, a request signal req and the end of packet signal eop, together with the data. The grant and request signals will now be discussed. The request and grant signals form part of a number of control signals issued with each packet to control data transmission. Since two data streams share each unidirectional data path, the control is provided to ensure that data arrives in the correct place. Moreover, it is important that any deadlock hazards are minimised. By having separate receiving buffers for responses and requests, the likelihood of deadlock is greatly reduced. A further factor which reduces deadlock is to give responses priority over requests. Each receiving buffer 28a, 29a, 28b, 29b has its own grant signal associated with it allowing, for example, responses to be sent even when the request path is saturated, and vice versa. That is, by allowing the receive response buffers 29a, 29b to operate independently from the request receive buffers 28, 28b, effectively two autonomous paths are provided. By multiplexing two data flows across the same set of physical paths, a pair of virtual channels is formed.

Figure 7:
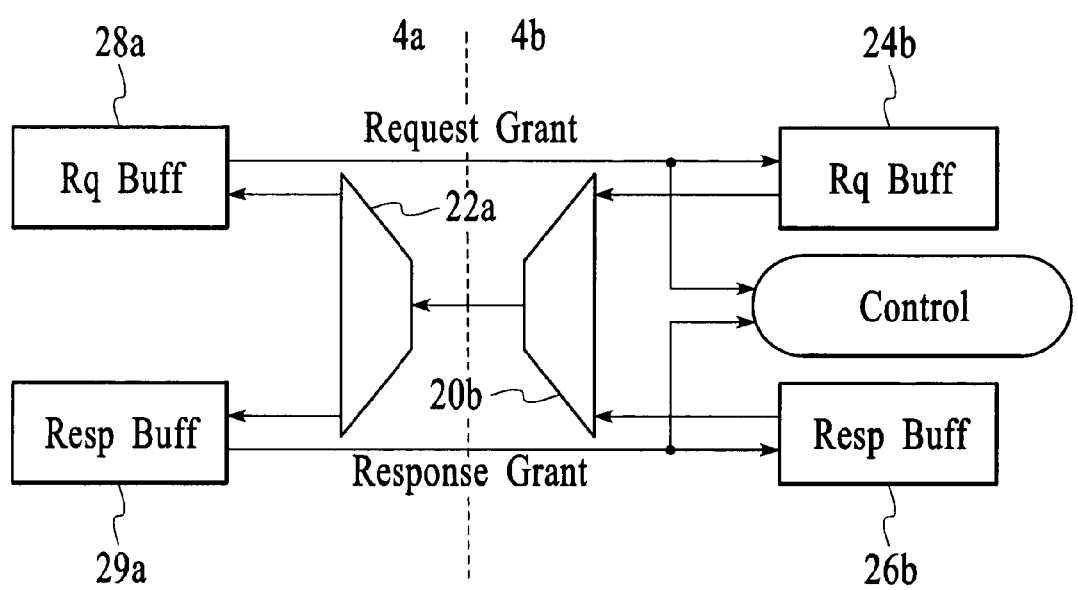
FIG. 7 is a schematic diagram illustrating operation of the buffers.

FIG. 7 is a schematic diagram illustrating how this is effected. FIG. 7 illustrates effectively the lower half of FIG. 3, in that it illustrates the request and response buffers 24b, 26b on the transmit side of the interface 4b and the request and response buffers 28a, 29a, on the receive side of the interface 4a. Note that the master and slave ports and other details of FIG. 3 are not shown in FIG. 7.

The request buffer 28a at the receiving interface 4a can transmit a grant signal directly to the transmitting request buffer 24b. That signal passes from the master port M to the slave port S using the port pins to be discussed in more detail later. Similarly, a response grant signal is supplied directly from the response buffer 29a on the receiving interface 4a to the response buffer 26b on the transmitting interface 4b. These grant signals are shoc_mignt, shoc_mtgnt.

Note that these grant signals are present in FIG. 3, although they are not illustrated in FIG. 3, merely forming part of the signal passing between the master and slave ports. Note also that the request signal is generated by the transmission port itself, based on whether the packet to be transmitted is a response packet or a request packet. An appropriate request signal is activated accordingly at the port, shoc_mreq.

The clock signal clk1 will now be discussed. This clock signal clk1 is supplied by the chip 1 and is used to clock the buffers 24a, 26a, 28a and 29a on the transmit interface 4a. Note that for the sake of clarity the clock signal clk1 is shown only as clocking the buffers 24a and 26a, although it is also supplied to the other buffers. The clock is transmitted via the master and slave ports of the interface in parallel to the chopped up packets transmitted by that interface, designated as shoc_mclko and is used to clock the logic in the receiving interface 4b. This clock can also be used for the logic circuit 6 itself if required. In particular, the clock is used to clock the buffers 24b, 26b, 28b and 29b on the receive interface 4b. The clock can be the same speed as the bus clock on the SuperHyway 2 on the integrated circuit 1, or it can be a second clock. The clock for the interface should always have a frequency equal to or less than the bus clock. By way of example, the clock could have a frequency of 133 MHz or lower.

Figure 8:
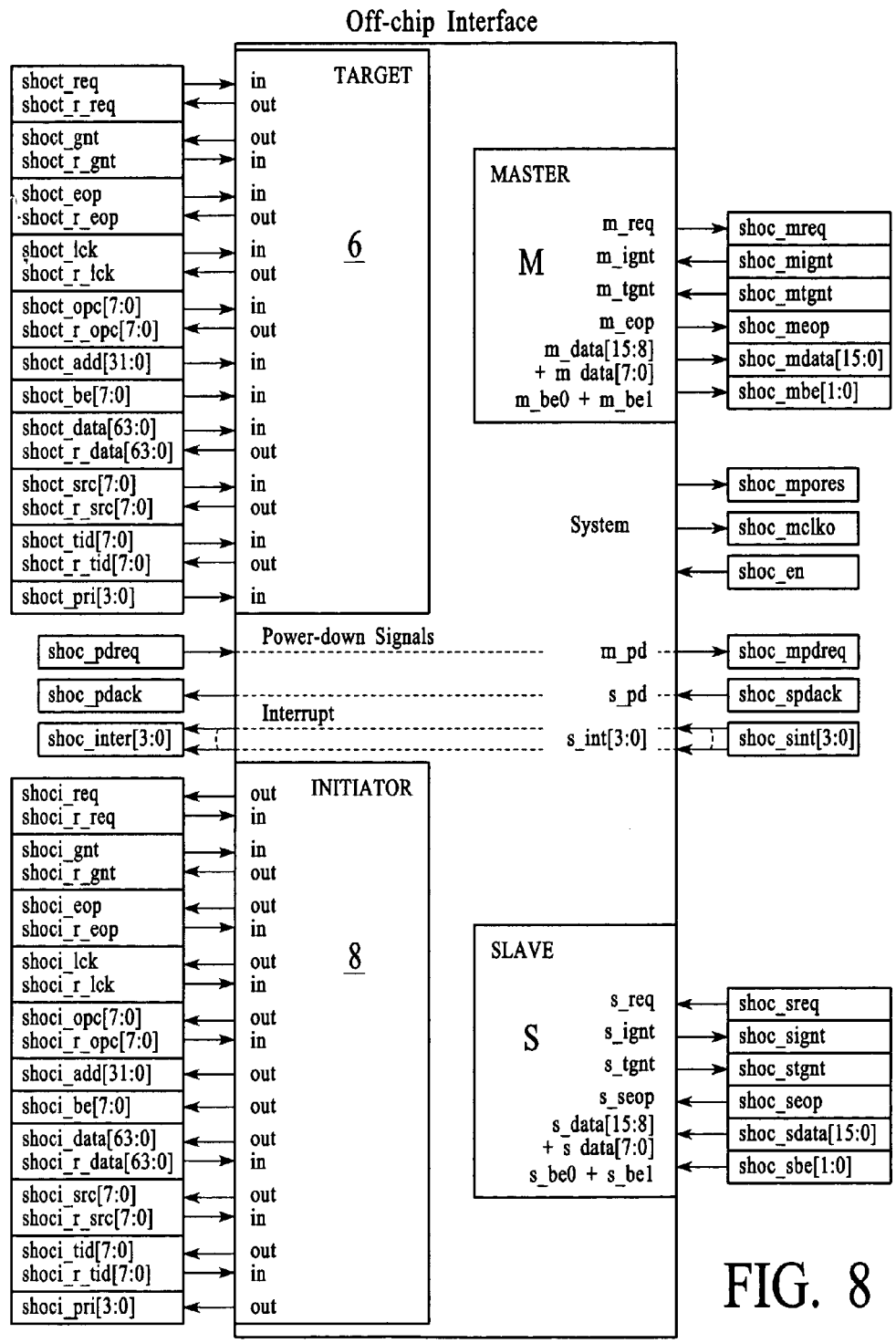
FIG. 8 is a detailed diagram showing the pin out of the interface.

A detailed diagram showing the portage of the SuperHyway off-chip interface 4 is given in FIG. 8. On the chip side of the interface 4 are shown the target port 6 and the initiator port 8.

Each of these ports is a wide port with multiple pins, the names of which are shown in FIG. 8. The nomenclature used for these pins is conventional and therefore reference will be made only to those pins which need to be understood in order to understand the present invention. It will nevertheless be noted that each of the target and initiator ports 6, 8 provide a bidirectional data stream, each direction carrying 64 bits of data. Transmissions across the target and initiator ports 6, 8 are in the parallel packet format discussed above and illustrated in FIG. 4A. In addition to a number of pins carrying the information in a packet format, some pins are dedicated to control purposes such as for the request and grant signals, shoct_req, shoctr_req, shoct_gnt, shoctr_gnt.

Thus, each port can be considered to provide a wide packet transmission pin out, together with packet transmission control signals.

The logic side of the interface comprises the master and slave ports M, S. These ports have a significantly reduced number of pins for carrying the data and control signals between the interface 4b and the logic circuit 6. In particular, note that the master and slave ports have 16 data pins labelled m_data [15:8, 7:0], m_data [15:8, 7:0], together with two byte enable pins, m_be0 and m_be1, m_be0 and m_be1. These pins are for carrying the chunks which have been discussed earlier with reference to FIG. 4B and 5. In addition, the master and slave ports have a single request pin, a single end of packet pin and two grant pins, initiator grant ignt, and target grant tgnt. These are for passing the request grant and response grant signals illustrated in FIG. 7.

A reset signal common to the rest of the chip is also provided to the logic circuit 6 via the interface.

The port also includes a number of system signals, the only one of which is of interest in relation to the present invention is the clock signal shoc_mclko which is the pin across which the clock clk1 is supplied.

Of particular importance, and as mentioned briefly above in relation to FIG. 2, the interface has dedicated power down signals and interrupt signals which are transmitted transparently across the interface. The power down signals are labelled pdreq and pdack (request power down and acknowledge power down), and the interrupt signals are labelled inter [3:0] at the system side and int [3:0] at the logic circuit side. These power down signals and interrupt signals are bonded straight through the port and thus can be connected directly without using up portage in the interface. The dedicated pins for carrying the power down signals and interrupt signals allow transparent addition of interrupts at the logic circuit side so that these signals do not have to form part of the data flow across the ports. By providing such dedicated support for interrupts and power down, this means that the circuit can be prototyped in the manner in which it will be implemented in reality.

What is claimed is:

1. An interface for carrying packets each comprising a plurality of fields between an on-chip communication path connected to at least one on-chip module and off-chip circuitry, said interface comprising;

at least one chip-side port comprising a plurality of pins for conveying the fields of the packet in parallel;

first and second circuit-side ports, each circuit-side port comprising a set of pins having a lower number than pins of said at least one chip-side port, each of said first and second circuit-side ports providing a unidirectional pathway between said interface and said off-chip circuitry;

means for transmitting interrupt signals from said off-chip circuit to said on-chip communication path in a manner such that said interrupt signals are indistinguishable from interrupt signals received from on-chip modules connected to said on-chip communication path; and means for conveying power down signals between said off-chip circuit and said on-chip communication path in a manner indistinguishable from power down signals provided between on-chip modules connected to said on-chip communication path.

2. An interface according to claim 1, wherein said means for conveying said power down signals comprises a third set of power down pins on the circuit side of the interface, a fourth set of power down pins on the chip-side of the interface and respective dedicated wires connecting said third and fourth sets of power down pins.

3. An interface according to claim 1, which comprises means for generating an interface clock signal from a system clock at a different frequency for controlling a chip on which the interface is implemented.

4. An interface according to claim 1, comprising circuitry for chopping a packet transmitted from the communication pathway on the plurality of pins of said at least one chip-side port so as to be transmitted in a plurality of cycles on the lower number of pins of said first circuit-side port.

5. An interface according to claim 1, comprising circuitry for reassembling data received in a plurality of cycles on said set of pins at said second circuit-side port into a single packet for transmission in parallel onto the communication path from said at least one chip-side port.

6. An interface according to claim 1, wherein said at least one chip-side port is bidirectional.

7. An interface according to claim 1, wherein said at least one port is a target port for receiving requests from an off-chip initiator module to an on-chip target module connected to said communication path and for transmitting target responses from said target module.

8. An interface according to claim 1, wherein said at least one port is an initiator port for transmitting requests from an on-chip initiator module connected to said communication path and transmitting responses from an off-chip target module to said initiator module.

9. An interface according to claim 1, wherein said at least one port is a target port, the interface further comprising an additional, similar port which is an initiator port.

10. An interface according to claim 1, with control circuitry for controlling said first and second circuit-side ports such that they can both be active simultaneously.

11. An interface according to claim 1, wherein said means for providing interrupt signals comprises a first group of dedicated pins on the circuit side of the interface, a second group of dedicated pins on the chip-side of the interface and respective dedicated wires interconnecting said pins.

12. An interface according to claim 1, wherein said means for providing interrupt signals comprises a first group of dedicated pins on the circuit side of the interface, a second group of dedicated pins on the chip-side of the interface and respective dedicated wires interconnecting said pins.

13. An interface according to claim 10, wherein said control circuitry comprises respective dedicated buffers for request packets and response packets communicated across each of said first and second circuit-side ports.

14. An interface for carrying packets each comprising a plurality of fields including a data field between an on-chip communication path connected to at least one on-chip module and off-chip circuitry, said interface comprising:
   at least one chip-side port comprising a plurality of pins for conveying the fields of the packet in parallel;
   first and second circuit-side ports each port comprising a set of pins having a lower number than the pins of said at least one chip-side port, each of said first and second circuit-side ports providing a unidirectional pathway for data between said interface and said off-chip circuitry;
   a set of interrupt connections for transmitting interrupt signals from said off-chip circuit to said on-chip communication path in a manner such that said interrupt signals are indistinguishable from interrupt signals received from on-chip modules connected to said on-chip communication path; and
   a set of power down connections for conveying power down signals between said off-chip circuit and said on-chip communication path in a manner indistinguishable from power down signals provided between on-chip modules connected to said on-chin communication path.

* * * * *